(12) United States Patent  
Plotkin et al.

(10) Patent No.: US 8,430,092 B2  
(45) Date of Patent: Apr. 30, 2013

(54) PANEL SUPPORT SYSTEM FOR SOLAR BOILERS

(75) Inventors: Andrew Plotkin, Worcester, MA (US); Russell Ricci, Brookfield, MA (US); Ivo Slezak, Hubbardston, MA (US)

(73) Assignee: Babcock Power Services, Inc., Worcester, MA (US)

( * ) Notice: Subject to any disclaimer, the term of this patent is extended or adjusted under 35 U.S.C. 154(b) by 458 days.

(21) Appl. No.: 12/703,861

(22) Filed: Feb. 11, 2010

(65) Prior Publication Data

US 2010/0199977 A1 Aug. 12, 2010

Related U.S. Application Data

(60) Provisional application No. 61/151,984, filed on Feb. 12, 2009, provisional application No. 61/152,011, filed on Feb. 12, 2009, provisional application No. 61/152,035, filed on Feb. 12, 2009, provisional application No. 61/152,049, filed on Feb. 12, 2009, provisional application No. 61/152,077, filed on Feb. 12, 2009, provisional application No. 61/152,114, filed on Feb. 12, 2009, provisional application No. 61/152,286, filed on Feb. 13, 2009.

(51) Int. Cl.  
*F24J 2/04* (2006.01)

(52) U.S. Cl.  
USPC ........... 126/634; 126/569; 126/680; 126/684; 126/694; 126/698; 52/173.1; 52/173.3; 52/645; 52/745.19

(58) Field of Classification Search .................. 126/634, 126/680, 569, 684, 698, 694; 52/645, 745.19, 52/173.3, 173.1  
See application file for complete search history.

(56) References Cited

U.S. PATENT DOCUMENTS

| | | | |
|---|---|---|---|
| 2,383,234 | A | 8/1945 | Barnes |
| 3,197,343 | A | 7/1965 | Palmatier |
| 3,208,877 | A | 9/1965 | Merry |
| 3,325,312 | A | 6/1967 | Sonntag, Jr. |
| 3,450,192 | A | 6/1969 | Hay |

(Continued)

FOREIGN PATENT DOCUMENTS

| | | |
|---|---|---|
| FR | 2501839 A1 | 9/1982 |
| JP | 53131309 A | 11/1978 |
| JP | 08326223 A | 12/1996 |
| WO | WO-2008154599 A1 | 12/2008 |

OTHER PUBLICATIONS

U.S. Appl. No. 60/943,096, Kroizer.

(Continued)

*Primary Examiner* — Avinash Savani  
(74) *Attorney, Agent, or Firm* — Edwards Wildman Palmer LLP; Joshua L. Jones

(57) ABSTRACT

A boiler for a solar receiver includes a panel support structure. A boiler stay is operatively connected to the panel support structure. A panel stay is slideably engaged to the boiler stay. A boiler panel is operatively connected to the panel stay with the panel stay being affixed to a plurality of tubes of the panel. The boiler stay and panel support assemblies are configured and adapted to slide with respect to one another to accommodate thermal expansion of the boiler panel. In certain embodiments, a pin connects the boiler stay and the panel stay, wherein the pin is removable for installation and removal of the panel from the support structure.

1 Claim, 9 Drawing Sheets

U.S. PATENT DOCUMENTS

| | | | |
|---|---|---|---|
| 3,459,597 A | 8/1969 | Baron | |
| 3,464,402 A | 9/1969 | Collura | |
| 3,822,692 A | 7/1974 | Demarest | |
| 3,823,703 A | 7/1974 | Lanciault | |
| 3,893,506 A | 7/1975 | Laing | |
| 3,924,604 A | 12/1975 | Anderson | |
| 3,927,659 A | 12/1975 | Blake et al. | |
| 3,951,108 A | 4/1976 | Rees | |
| 3,968,652 A | 7/1976 | Chevalier | |
| 3,991,742 A | 11/1976 | Gerber | |
| 3,995,804 A | 12/1976 | Folds et al. | |
| 4,003,366 A | 1/1977 | Lightfoot | |
| 4,037,639 A | 7/1977 | Jones | |
| 4,088,266 A | 5/1978 | Keyes | |
| 4,094,147 A | 6/1978 | Alleau et al. | |
| 4,112,921 A | 9/1978 | MacCracken | |
| 4,120,288 A | 10/1978 | Barrett | |
| 4,127,102 A | 11/1978 | Berman | |
| 4,127,103 A | 11/1978 | Klank et al. | |
| 4,128,096 A | 12/1978 | Katz | |
| 4,136,674 A | 1/1979 | Korr | |
| 4,191,246 A | 3/1980 | Cassell | |
| 4,204,523 A | 5/1980 | Rothe | |
| 4,205,658 A | 6/1980 | Clark | |
| 4,210,122 A | 7/1980 | Artweger | |
| 4,212,293 A * | 7/1980 | Nugent | 126/711 |
| 4,215,676 A | 8/1980 | Gilliam | |
| 4,237,861 A | 12/1980 | Fayard et al. | |
| 4,245,618 A | 1/1981 | Wiener | |
| 4,253,801 A | 3/1981 | O'Hare | |
| 4,257,477 A | 3/1981 | Maloney | |
| 4,261,330 A | 4/1981 | Reinisch | |
| 4,265,223 A | 5/1981 | Miserlis et al. | |
| 4,269,172 A | 5/1981 | Parker et al. | |
| 4,273,100 A | 6/1981 | Cogliano | |
| 4,280,483 A | 7/1981 | Schaffer | |
| 4,289,114 A | 9/1981 | Zadiraka | |
| 4,296,730 A | 10/1981 | Zadiraka | |
| 4,296,733 A | 10/1981 | Saunders | |
| 4,312,687 A | 1/1982 | Sigworth, Jr. | |
| 4,313,304 A | 2/1982 | Hunt | |
| 4,320,663 A | 3/1982 | Francia | |
| 4,324,229 A | 4/1982 | Risser | |
| 4,338,991 A | 7/1982 | Sigworth, Jr. | |
| 4,350,374 A | 9/1982 | Brollo | |
| 4,353,356 A | 10/1982 | Vandenbossche | |
| 4,359,043 A | 11/1982 | Dominique et al. | |
| 4,367,726 A | 1/1983 | Maes, Jr. | |
| 4,371,035 A | 2/1983 | Soligno | |
| 4,373,512 A | 2/1983 | Hirt | |
| 4,380,996 A | 4/1983 | Mengeringhausen | |
| 4,384,550 A | 5/1983 | Miller | |
| 4,394,859 A | 7/1983 | Drost | |
| 4,400,847 A * | 8/1983 | Farber | 16/223 |
| 4,404,960 A | 9/1983 | Laing | |
| 4,416,265 A | 11/1983 | Wallace | |
| 4,428,361 A | 1/1984 | Straza | |
| 4,432,341 A | 2/1984 | Howe et al. | |
| 4,454,863 A | 6/1984 | Brown et al. | |
| 4,485,803 A | 12/1984 | Wiener | |
| 4,503,903 A | 3/1985 | Kramer | |
| 4,512,336 A | 4/1985 | Wiener | |
| 4,535,755 A | 8/1985 | Roberts | |
| 4,569,331 A | 2/1986 | Tani et al. | |
| 4,615,381 A | 10/1986 | Maloney | |
| 4,653,470 A | 3/1987 | Carli et al. | |
| 4,660,630 A | 4/1987 | Cunningham et al. | |
| 4,665,894 A | 5/1987 | Juhasz | |
| 4,712,338 A | 12/1987 | Trickel | |
| 4,768,345 A | 9/1988 | Kardas | |
| 4,832,119 A | 5/1989 | Bloor et al. | |
| 4,867,133 A | 9/1989 | Sadler | |
| 4,946,512 A | 8/1990 | Fukuroi et al. | |
| 4,972,806 A | 11/1990 | Marsault | |
| 5,163,821 A | 11/1992 | Kelly et al. | |
| 5,174,128 A | 12/1992 | Bourne et al. | |
| 5,201,282 A | 4/1993 | Albrecht | |
| 5,217,000 A | 6/1993 | Pierce-Bjorklund | |
| 5,342,016 A | 8/1994 | Marsault et al. | |
| 5,368,092 A | 11/1994 | Rearden et al. | |
| 5,404,937 A | 4/1995 | Assaf et al. | |
| 5,417,052 A | 5/1995 | Bharathan et al. | |
| 5,444,972 A | 8/1995 | Moore | |
| 5,482,233 A | 1/1996 | Marko et al. | |
| 5,694,774 A | 12/1997 | Drucker | |
| 5,727,379 A | 3/1998 | Cohn | |
| 5,823,176 A | 10/1998 | Harris | |
| 5,850,831 A | 12/1998 | Marko | |
| 5,857,322 A | 1/1999 | Cohn | |
| 5,862,800 A | 1/1999 | Marko | |
| 5,881,456 A | 3/1999 | Bergins et al. | |
| 5,943,985 A | 8/1999 | Hartman | |
| 6,126,120 A | 10/2000 | Quaranta et al. | |
| 6,155,339 A | 12/2000 | Grapengater | |
| 6,173,927 B1 | 1/2001 | Delsol | |
| 6,240,156 B1 | 5/2001 | Matsumoto et al. | |
| 6,301,928 B1 | 10/2001 | Tanatsugu et al. | |
| 6,414,237 B1 * | 7/2002 | Boer | 136/251 |
| 6,434,942 B1 | 8/2002 | Charlton | |
| 6,487,859 B2 | 12/2002 | Mehos et al. | |
| 6,497,102 B2 | 12/2002 | Liebig | |
| 6,532,953 B1 | 3/2003 | Blackmon et al. | |
| 6,668,555 B1 | 12/2003 | Moriarty | |
| 6,708,687 B2 | 3/2004 | Blackmon, Jr. et al. | |
| 6,736,134 B2 | 5/2004 | Marko | |
| 6,913,015 B2 | 7/2005 | Pajk | |
| 6,926,440 B2 | 8/2005 | Litwin | |
| 6,931,851 B2 | 8/2005 | Litwin | |
| 7,011,086 B2 | 3/2006 | Litwin | |
| 7,297,866 B2 * | 11/2007 | Aschenbrenner | 136/246 |
| 7,600,350 B2 | 10/2009 | Braunstein | |
| 7,640,746 B2 | 1/2010 | Skowronski et al. | |
| 7,806,377 B2 | 10/2010 | Strizki | |
| 2001/0010222 A1 | 8/2001 | Prueitt | |
| 2002/0029869 A1 | 3/2002 | Kodumudi et al. | |
| 2003/0041856 A1 | 3/2003 | Blackmon et al. | |
| 2003/0094193 A1 * | 5/2003 | Mapes et al. | 136/244 |
| 2004/0035111 A1 | 2/2004 | Ven et al. | |
| 2004/0112374 A1 | 6/2004 | Litwin | |
| 2004/0139961 A1 | 7/2004 | Blackmon et al. | |
| 2004/0244376 A1 | 12/2004 | Litwin et al. | |
| 2004/0251002 A1 | 12/2004 | Reichle et al. | |
| 2004/0255571 A1 | 12/2004 | Fetescu et al. | |
| 2005/0016524 A1 | 1/2005 | Broatch | |
| 2006/0225863 A1 | 10/2006 | Levin | |
| 2006/0260314 A1 | 11/2006 | Kincaid et al. | |
| 2007/0089775 A1 | 4/2007 | Lasich | |
| 2007/0119718 A1 | 5/2007 | Gibson et al. | |
| 2007/0227531 A1 | 10/2007 | Garcia Cors et al. | |
| 2007/0295382 A1 | 12/2007 | Oak | |
| 2008/0000231 A1 | 1/2008 | Litwin et al. | |
| 2008/0022685 A1 | 1/2008 | Zhu | |
| 2008/0053523 A1 | 3/2008 | Brown et al. | |
| 2008/0078378 A1 | 4/2008 | Zhu | |
| 2008/0092551 A1 | 4/2008 | Skowronski | |
| 2008/0256953 A1 | 10/2008 | Arkas et al. | |
| 2008/0302357 A1 | 12/2008 | DeNault | |
| 2009/0014057 A1 | 1/2009 | Croft et al. | |
| 2009/0101134 A1 | 4/2009 | Merrett | |
| 2009/0107146 A1 | 4/2009 | Lin | |
| 2009/0114269 A1 | 5/2009 | Fletcher et al. | |
| 2009/0114270 A1 | 5/2009 | Stancel | |
| 2009/0199557 A1 | 8/2009 | Bennett | |
| 2009/0250051 A1 | 10/2009 | Lata Perez | |
| 2009/0260359 A1 | 10/2009 | Palkes | |
| 2009/0276993 A1 | 11/2009 | Fedock et al. | |
| 2010/0229853 A1 | 9/2010 | Vandal et al. | |
| 2010/0236183 A1 | 9/2010 | Cusson et al. | |

OTHER PUBLICATIONS

International Search Report and Written Opinion, dated Aug. 30, 2010 for PCT/US2010/023124.

International Search Report and Written Opinion, dated Aug. 31, 2010 for PCT/US2010/023165.

International Search Report and Written Opinion, dated Oct. 13, 2010 for PCT/US2010/023622.

International Search Report and Written Opinion, dated Oct. 13, 2010 for PCT/US2010/023826.
International Search Report and Written Opinion, dated Dec. 13, 2010 for PCT/US2010/023367.

International Search Report and Written Opinion, dated Dec. 13, 2010 for PCT/US2010/023500.

* cited by examiner

PANEL SUPPORT SYSTEM FOR SOLAR BOILERS

CROSS-REFERENCE TO RELATED APPLICATIONS

This application claims priority to U.S. Provisional Application No. 61/151,984, filed Feb. 12, 2009, to U.S. Provisional Application No. 61/152,011, filed Feb. 12, 2009, to U.S. Provisional Application No. 61/152,035, filed Feb. 12, 2009, to U.S. Provisional Application No. 61/152,049, filed Feb. 12, 2009, to U.S. Provisional Application No. 61/152,077, filed Feb. 12, 2009, to U.S. Provisional Application No. 61/152,114, filed Feb. 12, 2009, and to U.S. Provisional Application No. 61/152,286, filed Feb. 13, 2009, each of which is incorporated by reference herein in its entirety.

BACKGROUND OF THE INVENTION

1. Field of the Invention

The present invention relates to solar power production, and more particularly, to solar receiver panels for use in solar boilers.

2. Description of Related Art

Solar power generation has been considered a viable source to help provide for energy needs in a time of increasing consciousness of the environmental aspects of power production. Solar energy production relies mainly on the ability to collect and convert energy freely available from the sun and can be produced with very little impact on the environment. Solar power can be utilized without creating radioactive waste as in nuclear power production, and without producing pollutant emissions including greenhouse gases as in fossil fuel power production. Solar power production is independent of fluctuating fuel costs and does not consume non-renewable resources.

Solar power generators generally employ fields of controlled mirrors, called heliostats, to gather and concentrate sunlight on a receiver to provide a heat source for power production. A solar receiver typically takes the form of a panel of tubes conveying a working fluid therethrough. Previous solar generators have used working fluids such as molten salt because it has the ability to store energy, allowing power generation when there is no solar radiation. The heated working fluids are typically conveyed to a heat exchanger where they release heat into a second working fluid such as air, water, or steam. Power is generated by driving heated air or steam through a turbine that drives an electrical generator.

More recently, it has been determined that solar power production can be increased and simplified by using water/steam as the only working fluid in a receiver that is a boiler. This can eliminate the need for an inefficient heat exchanger between two different working fluids. This development has lead to new challenges in handling the intense solar heat without damage to the system. One such challenge is the fact that in typical fossil fuel boilers, heating occurs all around boiler tubing and thermal expansion is uniform, but in solar boilers the heating is all on one side of the boiler panels. A temperature gradient of up to about 300° F. can exist across the thickness of a solar boiler panel. This one-sided heating causes significant thermal expansion on the heliostat side of boiler panels while the reverse side, which is typically insulated, experiences significantly less expansion. The difference in thermal expansion on the two sides of boiler panels makes solar boiler panels tend to bow outward and can create stresses on the structures supporting the panels. Moreover, since solar boilers operate on a daily cycle, the stresses due to thermal expansion gradients can become the basis for fatigue failure.

One approach that has been used to address this problem is to support the panels from the bottom using supports that hold the panel from bowing in the middle, but allow for vertical movement. Such methods as are known are typically complicated in terms of installing, removing, and replacing panels from the supports. Additionally, systems that support boiler panels from the bottom require special plumbing to account for the fact that the top of the panels move due to thermal expansion, which is opposite of typical boiler configurations.

While the known systems of solar power production have generally been considered satisfactory for their intended purposes, there has remained a need in the art for supporting solar receiver panels in solar boilers that can reduce or eliminate bowing while accommodating vertical thermal expansion. There is also a need for such a support system that accommodates easy installation, removal, and replacement of boiler panels. The present invention provides a solution to these problems.

SUMMARY OF THE INVENTION

The subject invention is directed to a new and useful boiler for a solar receiver. The boiler includes a panel support structure. A boiler stay is operatively connected to the panel support structure. A panel stay is slideably engaged to the boiler stay. A boiler panel is operatively connected to the panel stay with the panel stay being affixed to a plurality of tubes of the panel. The boiler stay and panel support assemblies are configured and adapted to slide with respect to one another to accommodate thermal expansion of the boiler panel. In certain embodiments, a pin connects the boiler stay and the panel stay, wherein the pin is removable for installation and removal of the panel from the support structure.

The invention also includes a boiler for a solar receiver having an upper support elevation and one or more lower guide elevations. The boiler includes a panel support structure and a support assembly operatively connected to the panel support structure at the support elevation. A guide assembly is operatively connected to the panel support structure at a guide elevation below the support elevation. A first panel stay is engaged to the support assembly and a second panel stay is slideably engaged to the guide assembly. A boiler panel is operatively connected to the first panel stay proximate a first end of the panel and to the second panel stay proximate a second end of the panel. The support assembly and first panel stay are engaged together to support the panel vertically and to restrict movement of the panel horizontally. The guide assembly and second panel stay are engaged together to restrict movement of the panel horizontally and to slide vertically with respect to one another to accommodate thermal expansion of the panel in the vertical direction.

It is contemplated that the boiler can include an intermediate guide assembly operatively connected to the panel support structure at an intermediate elevation between the support elevation and the guide elevation. A third panel stay can be slideably engaged to the intermediate guide assembly. The intermediate guide assembly and third panel stay are engaged together to support the panel horizontally to restrict bowing of the panel under thermal expansion, and to slide with respect to one another to accommodate thermal expansion of the panel in the vertical direction. Each of the panel stays can be slideably engaged to the respective assembly to accommodate horizontal thermal growth in a lateral direction of the panel and to restrict movement of the panel in a horizontal direction perpendicular to the lateral direction.

The invention also includes a boiler for a solar receiver including a boiler panel having a plurality of parallel boiler tubes. A panel stay is affixed to the boiler panel. A boiler support assembly is affixed to a main boiler beam and is slidably engaged to the panel stay. The panel stay and the boiler support assembly are configured and adapted to slide with respect to one another to accommodate thermal expansion of the boiler panel.

In accordance with certain embodiments, a membrane is attached to at least two of the parallel boiler tubes that are adjacent. A plurality of tube clips can be attached to the membrane and to the panel stay. The panel stay can include a pair of parallel plates horizontally arranged one above and one below the boiler support assembly. A pin can be included that is insertable into bores defined in the pair of parallel plates so as to provide a slidable connection between the panel stay and the boiler support assembly.

These and other features of the systems and methods of the subject invention will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein.

DETAILED DESCRIPTION OF THE PREFERRED EMBODIMENTS

Figure 1:
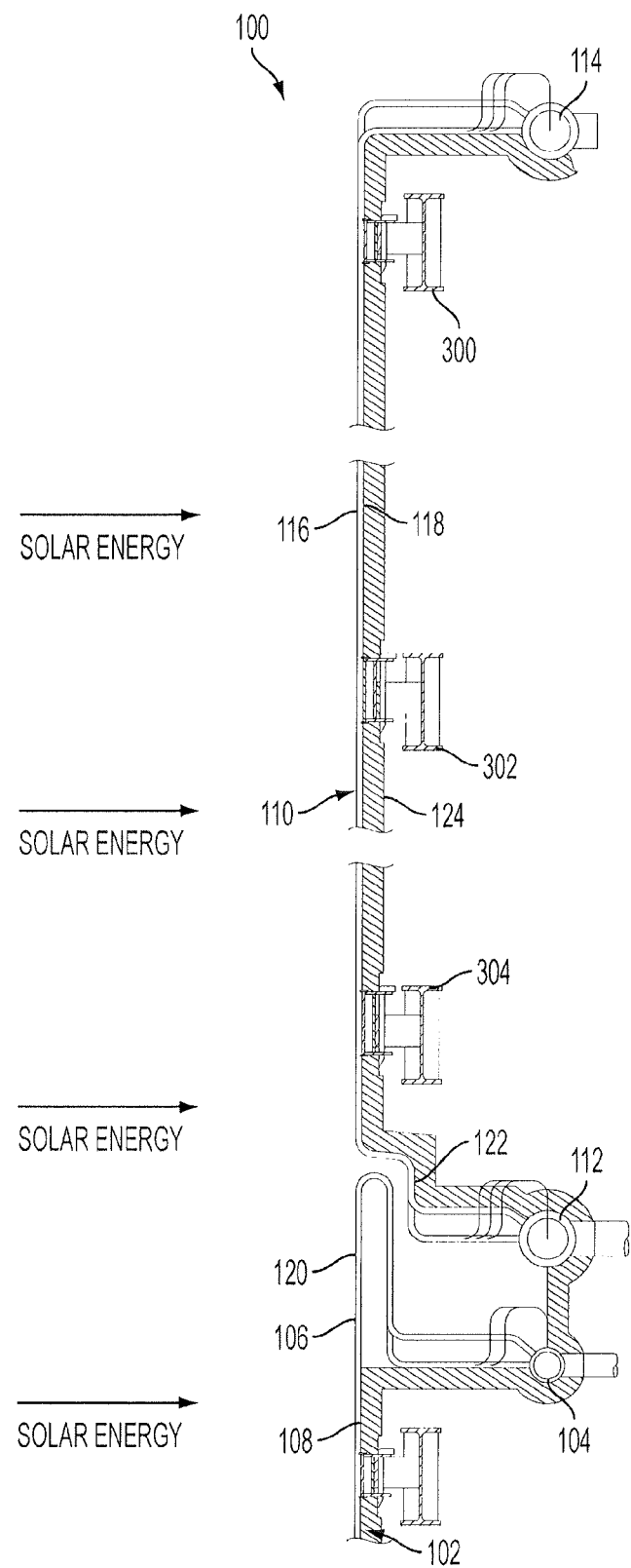
FIG. 1 is a side elevation view of a portion of a solar boiler constructed in accordance with the present invention, showing how the panel is connected to an underlying support structure.

Reference will now be made to the drawings wherein like reference numerals identify similar structural features or aspects of the subject invention. For purposes of explanation and illustration, and not limitation, a partial view of a boiler in accordance with the invention is shown in FIG. 1 and is designated generally by reference character 100. First and second exemplary embodiments of a boiler in accordance with the invention, or aspects thereof, are provided in FIGS. 2-9, as will be described. The systems of the invention can be used to improve support of receiver panels, for example in solar power generation.

FIG. 1 shows features of a solar boiler 100 constructed in accordance with the present invention. Boiler 100 for a solar receiver includes a first boiler panel 102 having a plurality of tubes fluidly connecting an inlet header (not shown, but see, e.g., 112) of the first boiler panel 102 to an outlet header 104 of the first boiler panel 102. The tubes of first boiler panel 102 form a first solar receiver surface 106 and a first internal surface 108 opposite first solar receiver surface 106. The exterior receiver surface 106 receives solar energy, for example from a field of heliostats, as indicated by arrows in FIG. 1.

A second boiler panel 110 similarly includes a plurality of tubes fluidly connecting an inlet header 112 of second boiler panel 110 to an outlet header 114 of second boiler panel 110. The tubes of second boiler panel 110 form a second solar receiver surface 116 and a second internal surface 118 opposite the second solar receiver surface 116 (i.e. external and internal surfaces, respectively, as indicated in FIG. 1). Like receiver surface 106, exterior receiver surface 116 receives solar energy, for example from a field of heliostats, as indicated by arrows in FIG. 1.

First and second boiler panels 102 and 110 are adjacent one another with an end 120 of first solar receiver surface 106 overlapping an end 122 of second boiler panel 110 to reduce solar radiation passing between the first and second solar receiver surfaces 106 and 116. The interior surfaces have a layer of insulating material 124 to protect the interior space and components from the high external temperatures.

Figure 2:
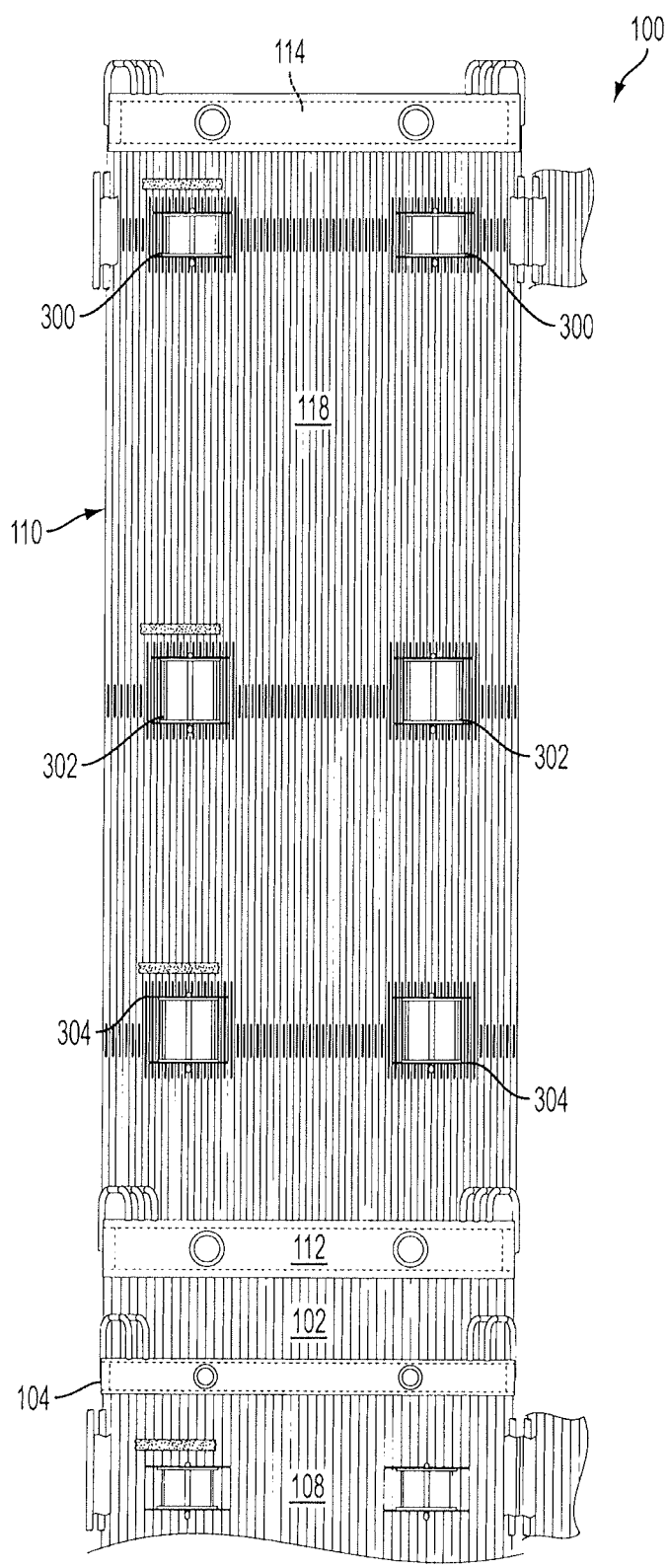
FIG. 2 is an interior elevation view of the portion of the solar boiler of FIG. 1, showing two upper supports and four lower guides for connecting the panel to the support structure.
Figure 3:
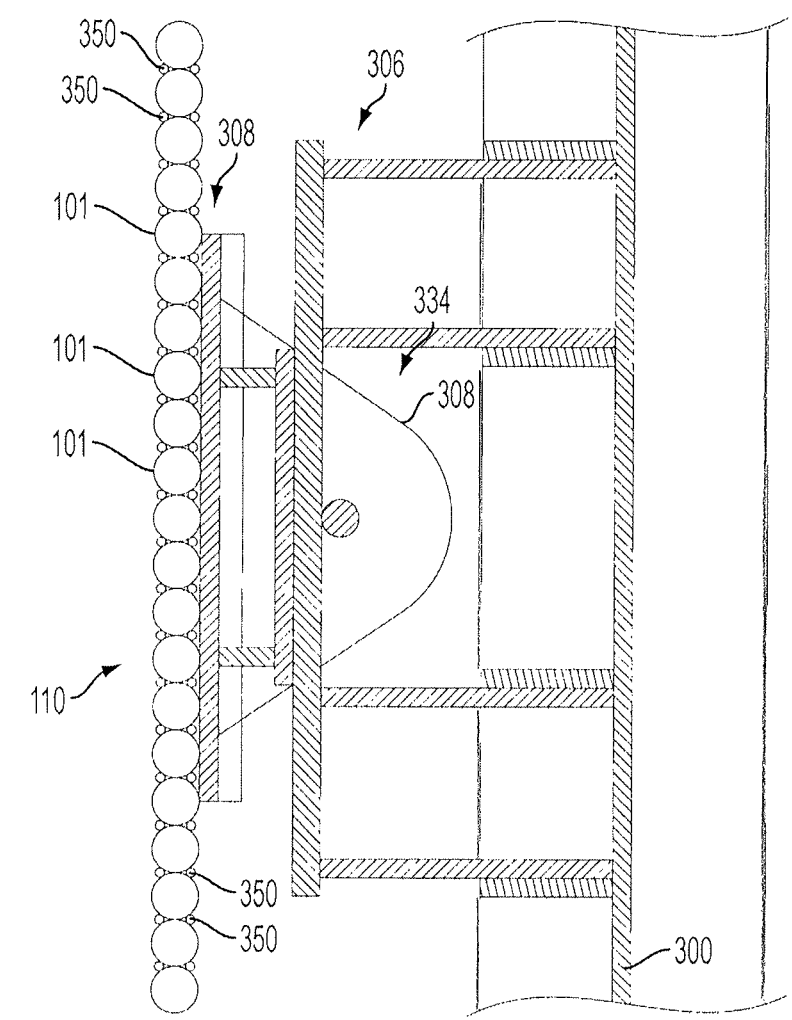
FIG. 3 is a cross-sectional plan view of a first exemplary embodiment of a support for connecting a boiler panel to an underlying structure in accordance with the present invention, showing the panel stay and boiler stay.

Boiler 100 includes a panel support structure, including beams 300, 302, and 304, each of which may have an "I" shape. FIG. 2 shows the same portion of boiler 100 from the interior, with insulating material 124 removed to show the tubes and headers. As indicated in FIG. 2, there are two places on beam 300 where panel 110 is supported, two places on beam 302 where panel 110 is guided, and two places on beam 304 where panel 110 is guided. In FIG. 3, one of the supports on beam 300 is shown in greater detail. A boiler stay 306 is operatively connected to beam 300. A panel stay 308 is slideably engaged to the boiler stay 306. Boiler panel 110 is operatively connected to panel stay 308 with panel stay 308 affixed to a plurality of tubes 101 of panel 110. The assemblies guiding panel 110 at beams 302 and 304 appear the same as that shown in FIG. 3 when viewed from the same view point.

Figure 4:
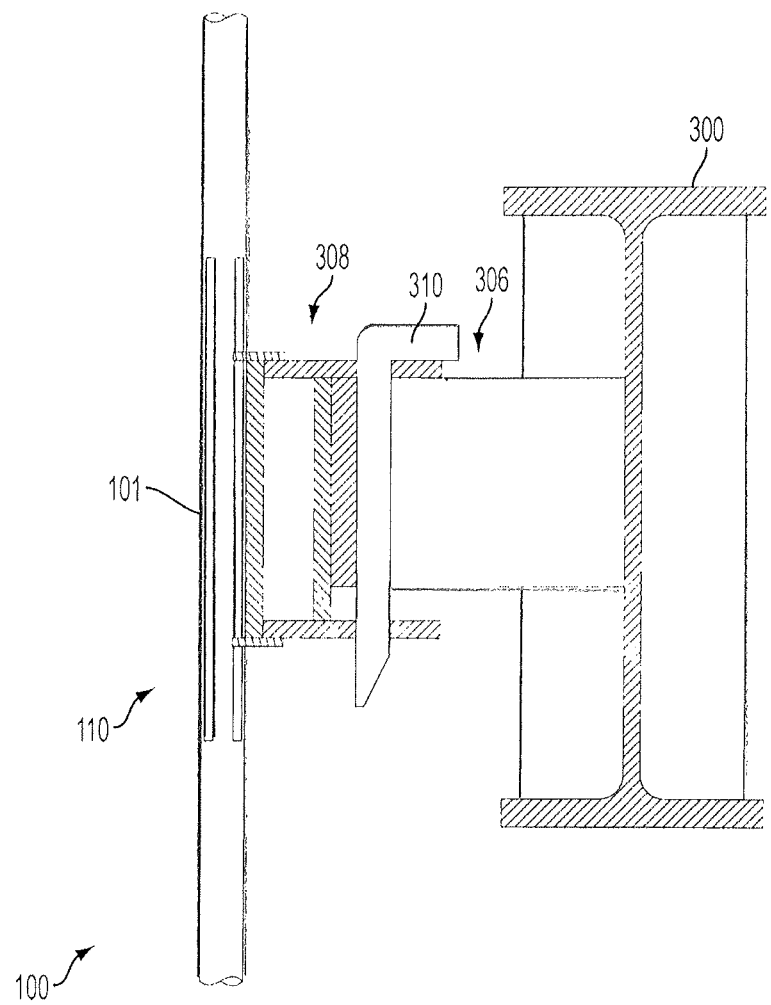
FIG. 4 is side elevation and partial cross-sectional view of the first exemplary embodiment of a top support constructed in accordance with the present invention, showing how the top support connects with a panel to support the weight of the panel.

As indicated by arrows in FIG. 4, boiler stay 306 and panel stay 308 are configured and adapted to support the weight of panel 110 on beam 300. Pin 310 pins a portion of boiler stay 306 between pin 310 and a portion of panel stay 308. Since panel stay 308 rests on top of boiler stay 306, panel 110 is supported on beam 300, making panel 110 a top-supported structure, allowing most of the length of panel 110 to hang down from beam 300. This hanging configuration allows the top portion of panel 110 to remain relatively stationary while the lower portion of panel 110 is free to move vertically with thermal expansion and contraction.

Figure 5:
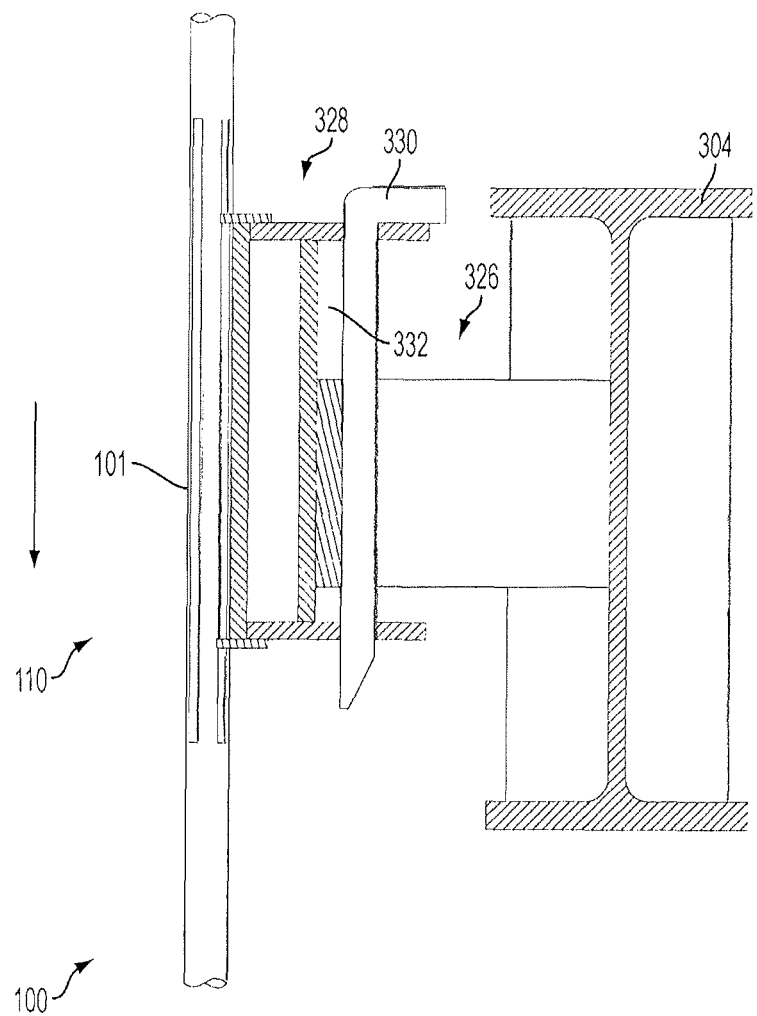
FIG. 5 is a side elevation and partial cross-sectional view of the first exemplary embodiment of a lower guide constructed in accordance with the present invention, showing how the lower guide connects with a panel to prevent bowing but accommodating thermal expansion and contraction of the panel in the vertical direction.

In order to accommodate thermal expansion of the boiler panel, the lower supports are configured as shown in FIG. 5. Panel 110 is supported at its lower portion by beam 304. A lower boiler stay 326 is operatively connected to a lower beam 304. A lower panel stay 328 is slideably engaged to the lower boiler stay 326 by means of pin 330, much as described above. Boiler panel 110 is operatively connected to lower panel stay 328 with lower panel stay 328 affixed to a plurality of tubes 101 of panel 110. Vertical spaces 332 allow for relative vertical sliding of assemblies 326 and 328 to accommodate for thermal expansion of panel 110 in the vertical direction, as indicated by the vertical arrow in FIG. 5. Middle beam 302 has similar supports connecting beam 302 to panel 110. This arrangement restricts outward bowing of panel 110 in the middle region when heliostats heat receiver surface 116, but allows for thermal expansion in the vertical direction as well as in the lateral direction. Lateral movement is provided for example by spaces 334 (shown in FIG. 3), by which the entire panel assembly has the ability to move laterally (in the case of FIG. 3, this means up and down the page). Panel 110 is allowed to move vertically at the lower guide levels (with reference to FIG. 5) by means of the cavities of spaces 332.

Figure 6:
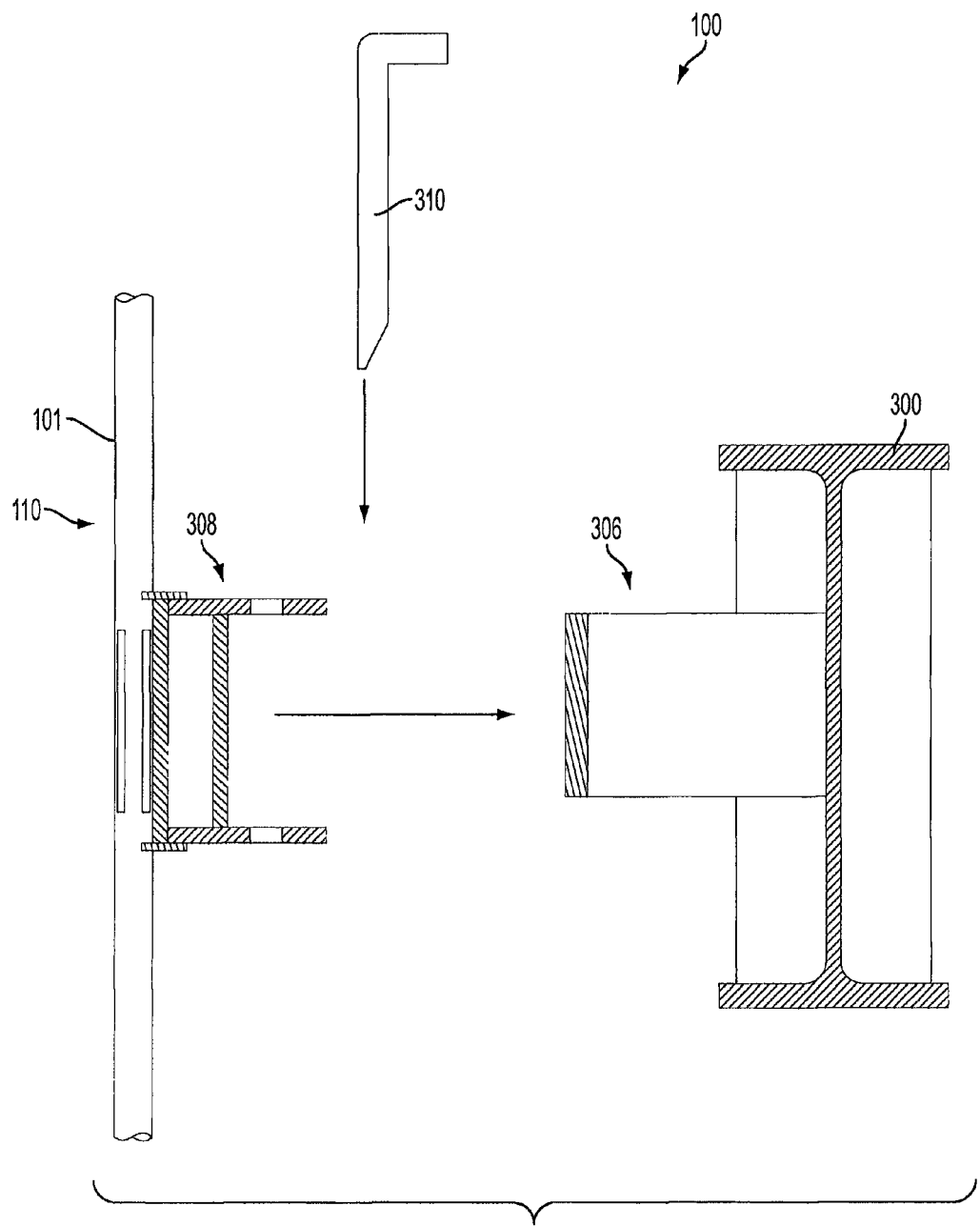
FIG. 6 is an exploded and partial cross-sectional view of the top support of FIG. 4, showing how the panel stay and boiler stay are assembled together.
Figure 7:
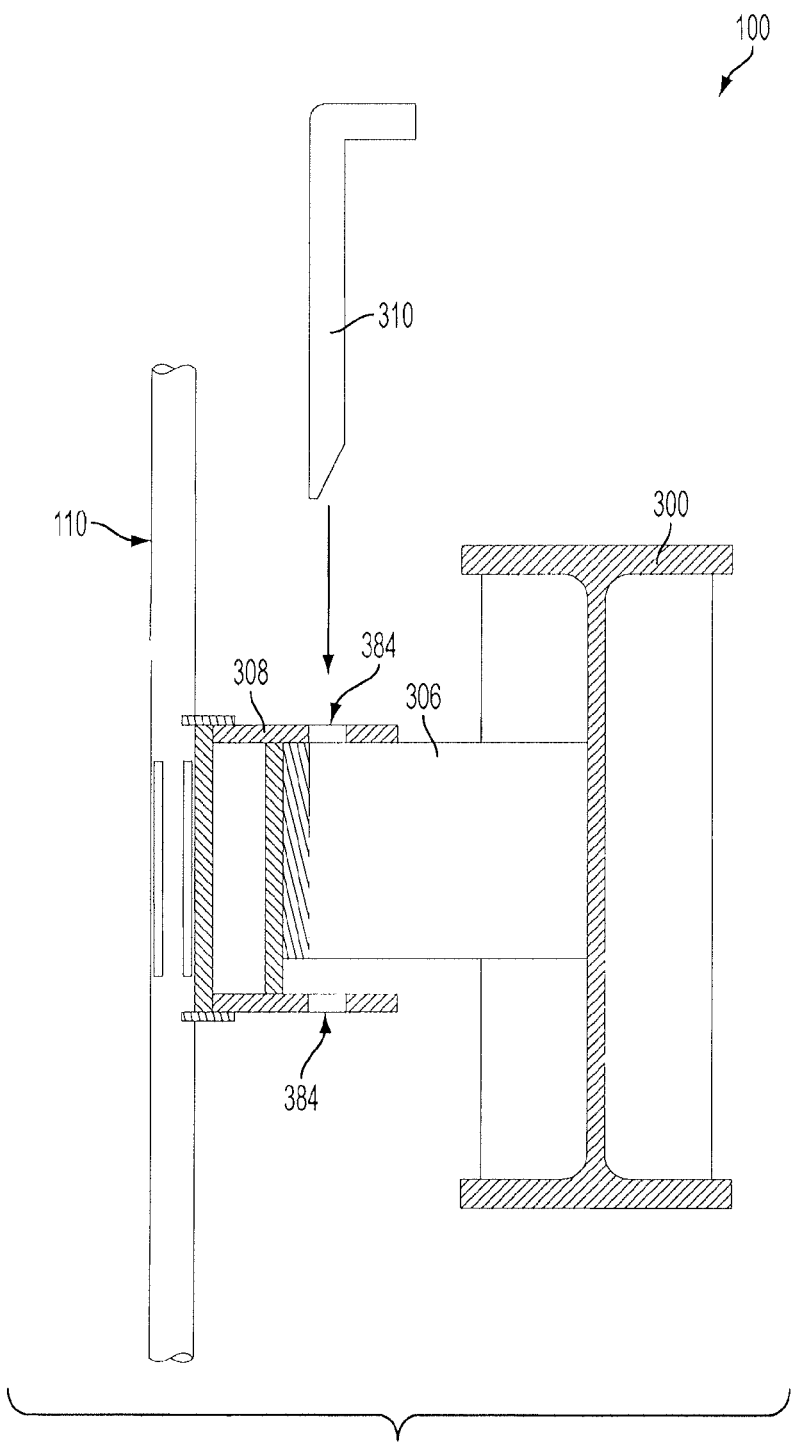
FIG. 7 is an exploded and partial cross-sectional view of the top support of FIG. 4, showing how the pin assembly connects the panel stay and the boiler stay together.

FIGS. 6 and 7 indicate the assembly of panel 110 onto the underlying support structure. Panel 110, affixed to panel stay 308 is aligned with boiler stay 306 and moved into place, as indicated in FIG. 6. As indicated in FIG. 7, pin 310 is moved into position, passing through the respective holes 384 in the top and bottom of panel stay 308, to fix the support in place. This same basic procedure is applied to the other five supports as well. Pin 310 is removable for installation and removal of panel 110 from beams 300, 302, and 304. For example, only six pins need to be removed to detach panel 110 from boiler 100, and only six pins need to be installed to mount panel 110 to boiler 100.

The unique support system holds solar boiler panels in a top supported design. The highest support level holds the panel in a fixed position (FIGS. 3 and 4), while lower support levels (at beams 302 and 304) simply guide the panels vertically which keeps the tubes in line vertically while still allowing for thermal expansion up and down (FIG. 5). All support levels use pinned connections, which allows for simple installation and removal. Another feature uses simple rods 350, each welded to two tubes in order to maintain coplanar alignment. The rods 350 can be seen in FIG. 3 as attached to the tubes 101 of panel 110. Rods 350 provide structural support for the tubes 101, holding them in line (tangent) and block leakage of solar radiation between the tubes 101, while allowing for lateral growth of the tubes 101 due to thermal expansion and contraction.

Figure 8:
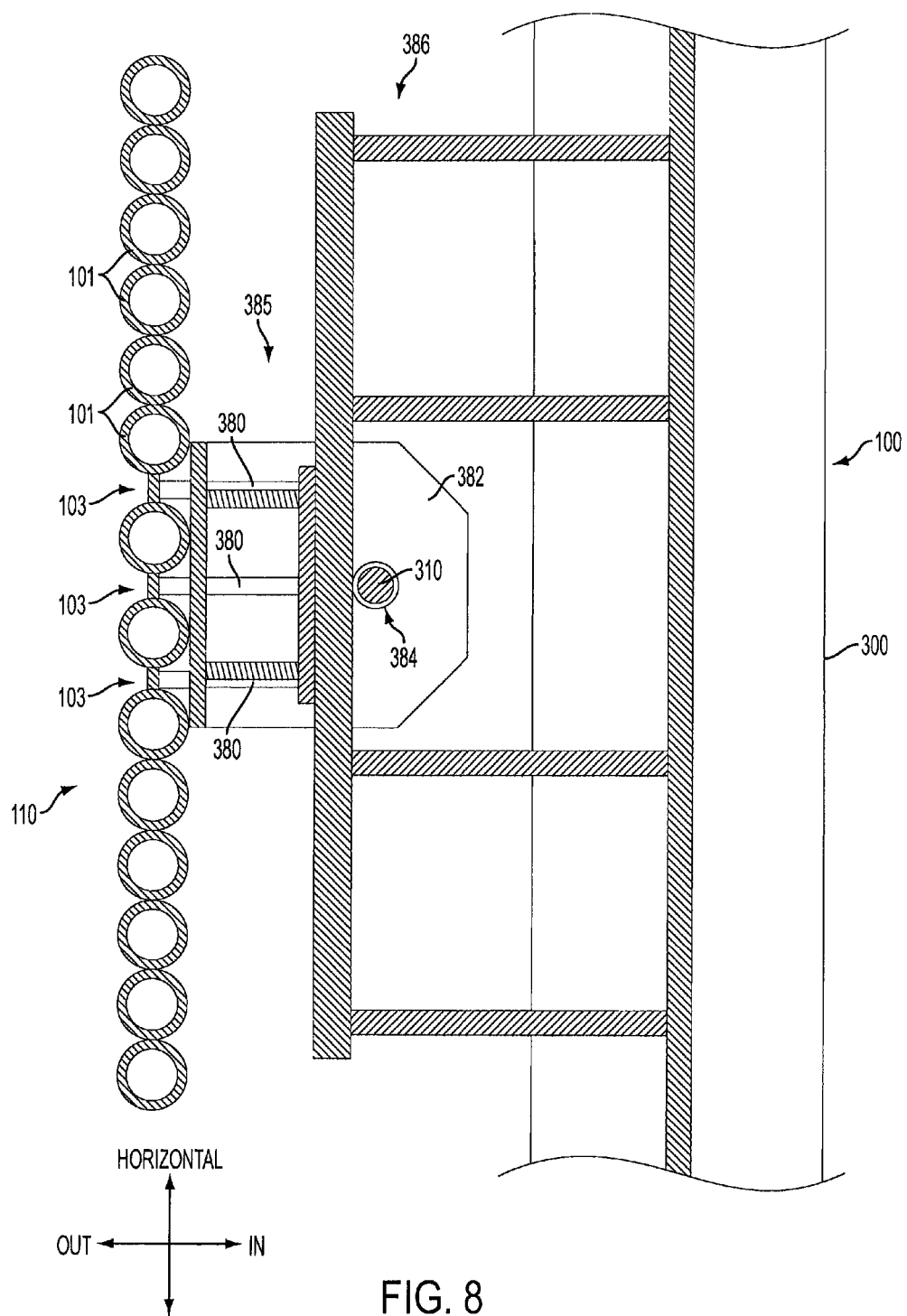
FIG. 8 is a cross-sectional plan view of a second exemplary embodiment of a support for connecting a boiler panel to an underlying structure in accordance with the present invention, showing panel stay and a boiler support assembly.
Figure 9:
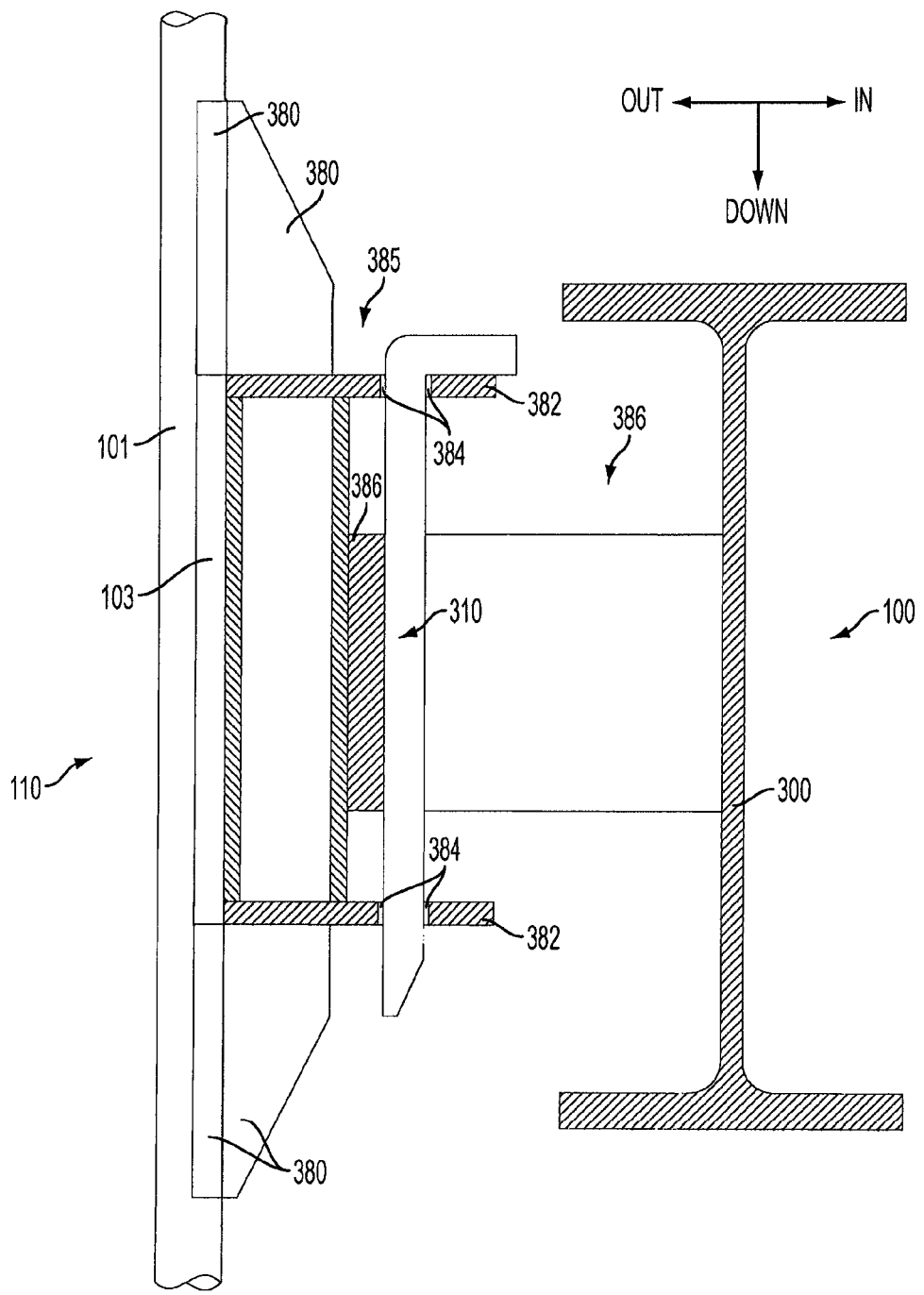
FIG. 9 is a side elevation and partial cross-sectional view of the second exemplary embodiment in accordance with the present invention, showing how a top support connects with a panel to support the weight of the panel.

FIGS. 8-9 show a second exemplary embodiment of the present invention, and correspond to the views shown in FIGS. 3-4, respectively, for the first exemplary embodiment. The second exemplary embodiment may utilize T-bar assemblies (not shown) instead of rods 350 to connect boiler tubes 101 together. At the panel support elevations several boiler tubes 101 switch from tangent construction to welded membrane construction 103. Tube clips 380 are welded to membrane 103. A pair of steel plates 382 are part of the panel stay 385. The panel stay 385 including steel plates 382 are joined to the boiler stay 386 by means of a slidable pinned connection. Pin 310 is inserted into holes 384 contained in steel plates 382. Pin 310 rests against the boiler stay 386 to prevent panel 110 from expanding or bowing outward at the lower guide elevations, i.e. beams 302 and 304. Steel plates 382 allow for minor horizontal expansions, but are limited by boiler stay 386. At guide elevations, steel plates 382 are spaced above boiler support steel assemblies 386 to allow vertical expansion downwards and to prevent panel 110 from bowing outward. At support elevations, the upper steel plates 382 rest directly on boiler support assemblies 386 to prevent downward expansion, similar to what is shown in FIG. 5 for the first exemplary embodiment. With panel 110 pinned to boiler stay 386, the load is transferred to main boiler steel beam 300. T-bar assemblies are described in commonly assigned U.S. patent application Ser. No. 12/701,999, which is incorporated by reference herein in its entirety.

Previously known support systems for solar boiler panels have had clips welded to each tube, have required high tolerance in construction, have required difficult alignment during installation, have complicated boiler construction by being bottom supported, and/or have restrained tubes against lateral thermal expansion. The methods and systems of the present invention, as described above and shown in the drawings provide for supporting the panels of a solar boiler from above and for accommodating vertical thermal expansion and contraction. This configuration provides improved limitation of outward bowing of panels, while still allowing for thermal expansion and contraction of the boiler sections. This configuration also allows for simple installation, removal, and replacement of solar boiler panels.

While steel has been used as an exemplary material in conjunction with the description above, those skilled in the art will readily appreciate that any suitable materials can be used without departing from the spirit and scope of the invention. While the apparatus and methods of the subject invention have been shown and described with reference to preferred embodiments, those skilled in the art will readily appreciate that changes and/or modifications may be made thereto without departing from the spirit and scope of the invention.

What is claimed is:

1. A boiler for a solar receiver comprising:
   a) a panel support structure;
   b) a support assembly operatively connected to the panel support structure at a support elevation;
   c) a guide assembly operatively connected to the panel support structure at a guide elevation below the support elevation;
   d) a first panel stay engaged to the support assembly;
   e) a second panel stay slideably engaged to the guide assembly;
   f) a boiler panel operatively connected to the first panel stay proximate a first end of the panel and to the second panel stay proximate a second end of the panel, wherein the support assembly and first panel stay are engaged together to support the panel vertically and to restrict movement of the panel horizontally, and wherein the guide assembly and second panel stay are engaged together to restrict movement of the panel horizontally and to slide vertically with respect to one another to accommodate thermal expansion of the panel in the vertical direction;
   g) a pin connecting the support assembly and the first panel stay, wherein the pin holds a portion of the support assembly between the pin and a portion of the first panel stay;

h) an intermediate guide assembly operatively connected to the panel support structure at an intermediate elevation between the support elevation and the guide elevation; and
i) a third panel stay slideably engaged to the intermediate guide assembly, wherein the intermediate guide assembly and third panel stay are engaged together to support the panel horizontally to restrict bowing of the panel under thermal expansion, and to slide with respect to one another to accommodate thermal expansion of the panel in the vertical direction;
wherein each of the panel stays is slideably engaged to the respective assembly to accommodate horizontal thermal growth in a lateral direction of the panel and to restrict movement of the panel in a horizontal direction perpendicular to the lateral direction.

\* \* \* \* \*